United States Patent
Chansarkar et al.

(10) Patent No.: US 8,593,342 B2
(45) Date of Patent: Nov. 26, 2013

(54) UTILIZING SBAS SIGNALS TO IMPROVE GNSS RECEIVER PERFORMANCE

(75) Inventors: Mangesh Chansarkar, Irvine, CA (US); Gang Xie, Orange, CA (US); Gengsheng Zhang, Cupertino, CA (US)

(73) Assignee: CSR Technology Holdings Inc., San Jose, CA (US)

( * ) Notice: Subject to any disclaimer, the term of this patent is extended or adjusted under 35 U.S.C. 154(b) by 984 days.

(21) Appl. No.: 12/402,426

(22) Filed: Mar. 11, 2009

(65) Prior Publication Data

US 2010/0232351 A1 Sep. 16, 2010

(51) Int. Cl.
*G01S 19/23* (2010.01)
*G01S 19/24* (2010.01)
*G01S 19/26* (2010.01)
*G01S 19/31* (2010.01)

(52) U.S. Cl.
USPC ............ 342/357.62; 342/357.63; 342/357.65; 342/357.71

(58) Field of Classification Search
USPC .............. 342/357.62, 357.63, 357.65, 357.71
See application file for complete search history.

(56) References Cited

U.S. PATENT DOCUMENTS

| | | | | |
|---|---|---|---|---|
| 5,760,738 A * | 6/1998 | Kawano | | 342/357.48 |
| 6,320,536 B1 * | 11/2001 | Sasaki | | 342/357.62 |
| 6,327,473 B1 | 12/2001 | Soliman et al. | | |
| 7,053,824 B2 * | 5/2006 | Abraham | | 342/357.64 |
| 7,142,157 B2 | 11/2006 | Garin et al. | | 342/357.15 |
| 7,403,154 B2 | 7/2008 | Garin et al. | | 342/357.15 |
| 7,466,264 B2 | 12/2008 | Lamance et al. | | |
| 7,602,334 B1 * | 10/2009 | Lorenz | | 342/357.29 |
| 8,023,960 B2 * | 9/2011 | Terashima | | 455/456.1 |
| 2005/0025264 A1 | 2/2005 | Chen | | |
| 2007/0247354 A1 | 10/2007 | Garin et al. | | 342/357.03 |
| 2008/0191936 A1 | 8/2008 | Phatak et al. | | 342/357.03 |
| 2008/0238765 A1 | 10/2008 | Zhang et al. | | 342/357.01 |

OTHER PUBLICATIONS

International Search Report issued Jul. 6, 2010 in corresponding PCT/US10/027047.

* cited by examiner

*Primary Examiner* — Cassie Galt
(74) *Attorney, Agent, or Firm* — Pillsbury Winthrop Shaw Pittman LLP (57) ABSTRACT

The present invention provides methods of performing GNSS receivers' satellite signal acquisition and TTFF while taking advantage of SBAS signals. Due to a SBAS satellite's geostationary position and typically strong signal, the SBAS satellite signal can be acquired more quickly than a GPS satellite signal. Once a SBAS satellite signal is acquired the Doppler frequency search uncertainty may be reduced for remaining GNSS satellites which are to be acquired. Furthermore, a satellite search list may be optimized to search for satellites close to the line of sight (LOS) of the SBAS satellite for which a signal has been acquired, in receiver "warm" and "hot" start modes. Moreover, since a SBAS signal sub-frame is only one second long, which is shorter than six seconds for a GPS signal sub-frame, synchronization of the SBAS signal sub-frame may be achieved faster than for GPS signals. With aided time information, a receiver may compute the absolute time of week (TOW) from a sub-frame synchronized SBAS signal. Therefore, TTFF can be achieved without necessarily waiting for TOW to be decoded from a GPS signal.

4 Claims, 10 Drawing Sheets

Reduction of Satellite Frequency Search Range for CDMA Receiver

FIG. 3

Optimization of SV Search List for CDMA Receiver

FIG. 4

SBAS Signal Data Block Format

FIG. 5

Extract TOW from Subframe-Synced SBAS Signals

Extract GPS Time from an SBAS Signal

FIG. 9

Determination of GPS Time from One or More Candidates, as in Figure 9, when there are Multiple Candidates within the Uncertainty of the Aided Time

FIG. 10

UTILIZING SBAS SIGNALS TO IMPROVE GNSS RECEIVER PERFORMANCE

FIELD OF THE INVENTION

The present invention is related to location positioning systems, and more particularly, to a method and apparatus of utilizing a satellite based augmentation system (SBAS) to improve receiver performance in a satellite positioning system such as a global positioning system (GPS).

BACKGROUND OF THE INVENTION

With the development of radio and space technologies, several satellite-based navigation systems (i.e. satellite positioning system or SPS) have already been built and more will be in use in the near future. SPS receivers, such as, for example, receivers using the Global Positioning System (GPS), also known as NAVSTAR, have become commonplace. Other examples of SPS systems include, but are not limited to, the United States (U.S.) Navy Navigation Satellite System (NNSS), the Russian counterpart to NAVSTAR known as the Global Navigation Satellite System (GLONASS), and any future Western European SPS such as the proposed Galileo program. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time-tagged signal referenced to an atomic clock. A typical GPS receiver locks onto this signal and extracts the data, for example, ephemeris parameters used to calculate satellite position and velocity, contained in it. Using signals from a sufficient number of satellites, a GPS receiver can calculate its position, velocity, altitude, and time.

The GPS receiver can distinguish signals from different satellites because the GPS system uses a code division multiple access (CDMA) spread-spectrum technique where the low-bitrate navigation message data is encoded with a high-rate pseudo-random number (PRN) sequence that is unique for each satellite. Two distinct CDMA encodings are used: the coarse/acquisition (C/A) code at 1.023 million chips per second, and the precise (P) code at 10.23 million chips per second. GPS satellite L1 carrier signal is modulated by both the C/A and P codes. The C/A code is public and used by civilian GPS receivers, while the P code may be encrypted in which case it is only available to military equipment with a proper decryption key.

A GPS receiver typically has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the PRN code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal samples. During the acquisition stage, the code phase search step is, for example, a half-chip long for some navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from the receiver's local oscillator instability.

The signals from the navigational satellites are modulated with navigational data at 50 bits/second (i.e. 1 bit/20 msec). This navigational data consists of ephemeris, almanac, time information, clock and other correction coefficients. This data stream is formatted as sub-frames and frames. A sub-frame consists of 300 bits of data and is thus transmitted over 6 seconds. In this sub-frame a group of 30 bits forms a word with the last six bits being the parity check bits. As a result, a sub-frame consists of 10 words. A frame of data consists of five sub-frames transmitted over 30 seconds. A complete set of navigation data consists of 25 frames sequentially transmitted over 12.5 minutes.

The first word of a sub-frame is known as the TLM word. The first eight bits of this TLM word, called the preamble, are always the same and used for frame synchronization (also called sub-frame synchronization). A Barker sequence is used as the preamble because of its excellent correlation properties. The second word of any frame is the HOW (Hand Over Word) and consists of TOW (Time Of Week), sub-frame ID, synchronization flag and parity, with the last two bits of parity always being '0's. These two '0's help in identifying the correct polarity of the navigation data bits. The words 3 to 10 of the first sub-frame contain clock correction coefficients and satellite quality indicators. The 3 to 10 words of the sub-frames 2 and 3 contain ephemeris. These ephemerides are used to precisely determine the position and velocity of the GPS satellites. These ephemerides are normally uploaded every two hours and are valid typically for four hours. The 3 to 10 words of the sub-frame 4 contain ionosphere and UTC time corrections and an almanac of satellites 25 to 32. The almanac is similar to the ephemeris but gives a less accurate orbit of the satellites and is typically valid for six months. The 3 to 10 words of the sub-frame 5 contain the almanac of satellites 1-24. The ephemeris of a particular signal from a satellite contains only the ephemeris of that satellite repeating in every frame. However, the almanac data of different satellites is broadcast in different frames (also called pages) of the navigation data signal of a given satellite. Thus the 25 frames transmit the almanac of all the 24 satellites in the sub-frame 5. Any additional spare satellite almanac is included in the sub-frame 4. The almanac and ephemeris are used in the computation of the position and velocity of the satellites at a given time.

Accordingly, it is clear from the foregoing that the process of locking onto and synchronizing to signals from positioning system satellites, and particularly to being able to extracting meaningful data from such signals in, for example, an autonomous mode, is an important process before determining position and navigating using such signals can begin.

After acquiring enough satellites, a GPS receiver still needs a quite accurate (for example, at the several-millisecond accuracy level) TOW to calculate satellite positions and velocities, which are needed in a conventional navigation algorithm for a GPS receiver position fix. However, obtaining TOW from navigation message data bits of some live satellite signals typically requires at least bit synchronization, data demodulation, and frame synchronization processes. These processes take time and are even regarded as overly time-consuming in some applications.

Accordingly, a method and apparatus for quickly and effectively acquiring signals from positioning system satellites, obtaining TOW and delivering the first position fix remains desirable.

Augmentation of a Global Navigation Satellite System (GNSS) is a method of improving the navigation system's attributes, such as accuracy, reliability, and availability, by providing external information. There are many such systems in place and they are generally named or described based on how the GNSS sensor receives the external information. A Satellite Based Augmentation System (SBAS) is a system that supports wide-area or regional augmentation through the use of additional satellite-broadcast messages. Such systems are commonly composed of multiple ground stations used to collect GNSS signal data, located at accurately-surveyed points, master stations to calculate GNSS measurement error corrections, and a number of geostationary satellites for broadcasting the corrections. GNSS satellites broadcast differential correction data, and integrity data, and these signals themselves may also be utilized as an extra ranging signal for triangulation. Correction data may include: long term satellite position error; short term and long term satellite clock errors; and ionosphere correction data. WAAS, European EGNOS, and Japanese MSAS are all examples of a SBAS.

While SBAS designs and implementations may vary widely, with SBAS being a general term referring to any such satellite-based augmentation system, under the International Civil Aviation Organization (ICAO) rules a SBAS must transmit a specific message format and frequency which matches the design of the United States' Wide Area Augmentation System (WAAS). See RTCA, Inc., *Minimum Operational Performance Standards for Global Positioning System/Wide Area Augmentation System Airborne Equipment*, RTCA/DO-229 B, 1999.

SBAS is designed to improve GPS availability, accuracy and integrity. The present invention includes methods which extend the benefit of SBAS to provide faster GPS satellite signal acquisition and reduce the time to first fix (TTFF).

SUMMARY OF THE INVENTION

The present invention provides methods of improving GNSS receivers' satellite signal acquisition and TTFF performances by taking advantage of SBAS signals. Due to a SBAS satellite's geostationary position and typically strong signal, the SBAS satellite signal can be acquired more quickly than a GPS satellite signal. Once a SBAS satellite signal is acquired the Doppler frequency search uncertainty may be reduced for remaining GNSS satellites which are to be acquired. Furthermore, a satellite search list may be optimized to search for satellites close to the line of sight (LOS) of the SBAS satellite for which a signal has been acquired, in receiver "warm" and "hot" start modes. Moreover, since a SBAS signal sub-frame is only one second long, which is shorter than six seconds for a GPS signal sub-frame, synchronization of the SBAS signal sub-frame may be achieved faster than for GPS signals. With aided time information, a receiver may compute the absolute time of week (TOW) from a sub-frame synchronized SBAS signal. Therefore, without necessarily waiting for TOW to be decoded from a GPS signal and with the SBAS signal frame synchronized, a receiver can achieve better TTFF performance.

The methods of this invention may be provided in CDMA signal receiver hardware and software running on processors which are part of GPS positioning systems.

According to aspects of the invention, a method of reducing satellite frequency search range for a CDMA signal receiver, comprises: searching for a geostationary satellite signal; acquiring the geostationary satellite signal; estimating receiver crystal oscillator frequency bias; and calculating a frequency search range for subsequent satellite signals to be acquired.

According to further aspects of the invention, a method of optimizing a satellite search list in a CDMA satellite receiver comprises: acquiring a geostationary satellite signal; calculating angles between the line of sight for the geostationary satellite and the line of sight for other satellites; flagging satellites for which the angle is less than a threshold value; and placing flagged satellites at the beginning of the satellite search list.

According to yet further aspects of the invention, a method in a GPS receiver of extracting GPS time from a satellite-based augmentation system (SBAS) satellite signal and aided time information comprises: acquiring the SBAS satellite signal; identifying a repeating SBAS signal sub-frame preamble; accepting aided time information; calculating one or more candidates for the GPS time; and determining the GPS time from the one or more candidates. The determining may include identifying the one of the one or more candidates that is within the uncertainty of the aided time. However, when there are multiple candidates within the uncertainty of the aided time, the determining includes: acquiring multiple satellite signals; generating a GPS position fix for each of the one or more candidates; calculating pseudo-range residuals for each of the one or more candidates; and choosing the one of the one or more candidates with the smallest residual.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
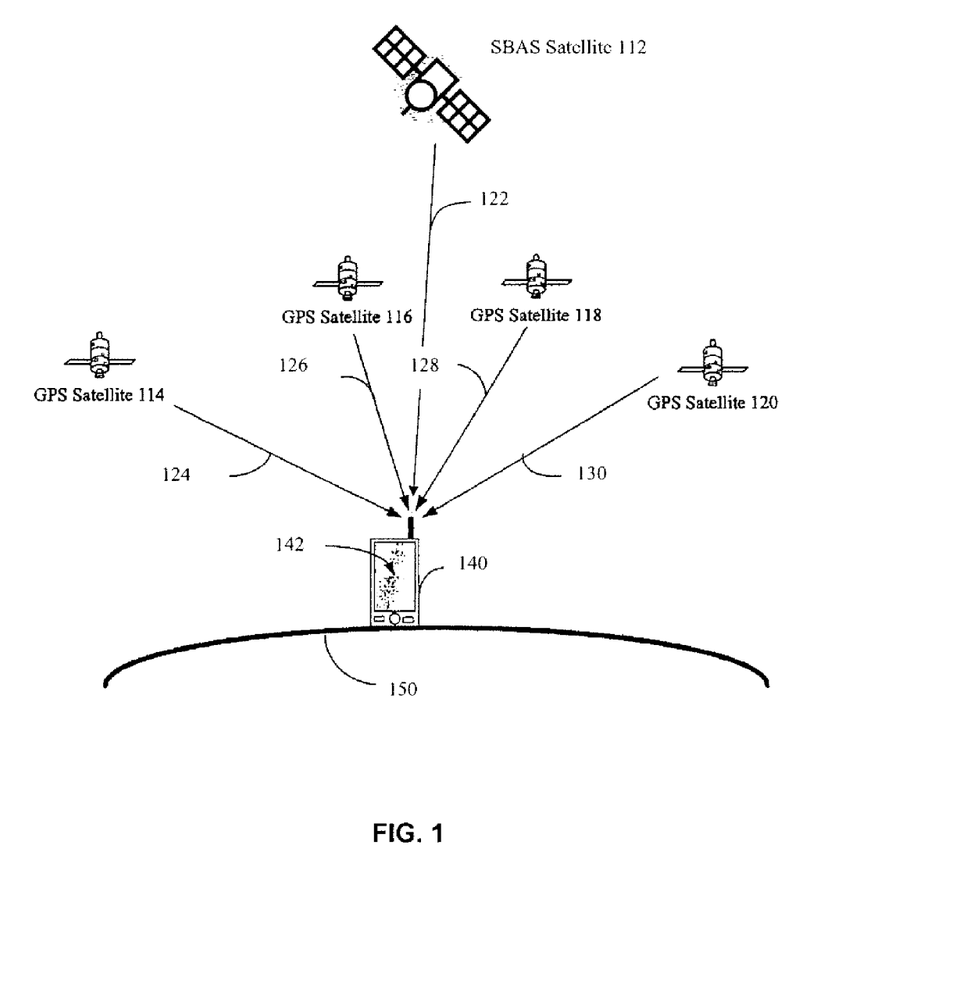
FIG. 1 is an illustration of an example implementation of principles of the invention.

FIG. 1 illustrates an example implementation of embodiments of the invention. As shown in FIG. 1, satellites, also referred to as space vehicles (SVs), 112, 114, 116, 118, 120 broadcast signals 122, 124, 126, 128 and 130, respectively, that are received by receiver 142 in handset 140, which is located at a user position somewhere relatively near the earth's surface 150. In this particular example, satellites 114, 116, 118 and 120 are GPS satellites and satellite 112 is a SBAS satellite. However, one or more of satellites 114, 116, 118 and 120 may also be SBAS satellites.

Handset 140 may be: a personal navigation device (PND), such as PNDs available from Garmin, TomTom, etc.; a cell or other type of telephone with built-in GPS functionality; or any GPS device embedded in tracking applications, such as automotive tracking from Trimble, package or fleet management tracking from FedEx, child locator tracking applications, etc.

Receiver 142 may be implemented using any combination of hardware and/or software, including systems on a chip (SoC), such as SiRFprima, and discrete GPS chipsets such as SiRFstarIII GSD3tw, SiRFstarIV GSD4t or SiRFstarIII GSC3e from SiRF Technology, and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets, SoCs and/or software with the methods of the present invention after being taught by the present specification.

The methods of this invention may be provided in software running on processors which are part of GPS systems. In addition to acquiring, tracking and measuring GPS signals, preferably the GPS receiver software is configured to acquire and track at least one SBAS signal, synchronize SBAS signal bits and sub-frames, demodulate data bits, Viterbi decode, decode SBAS messages, and generate range measurements (e.g., pseudorange, Doppler frequency, and carrier phase). The receiver 142 preferably is able to apply SBAS differential correction and to utilize SBAS signals as ranging signals in its navigation algorithm software. The receiver 142 preferably is able to load and save SBAS ephemerides and almanacs from and to a non-volatile memory. All of these mentioned functions, and more, are standard in most WAAS-enabled GPS receivers.

Figure 2:
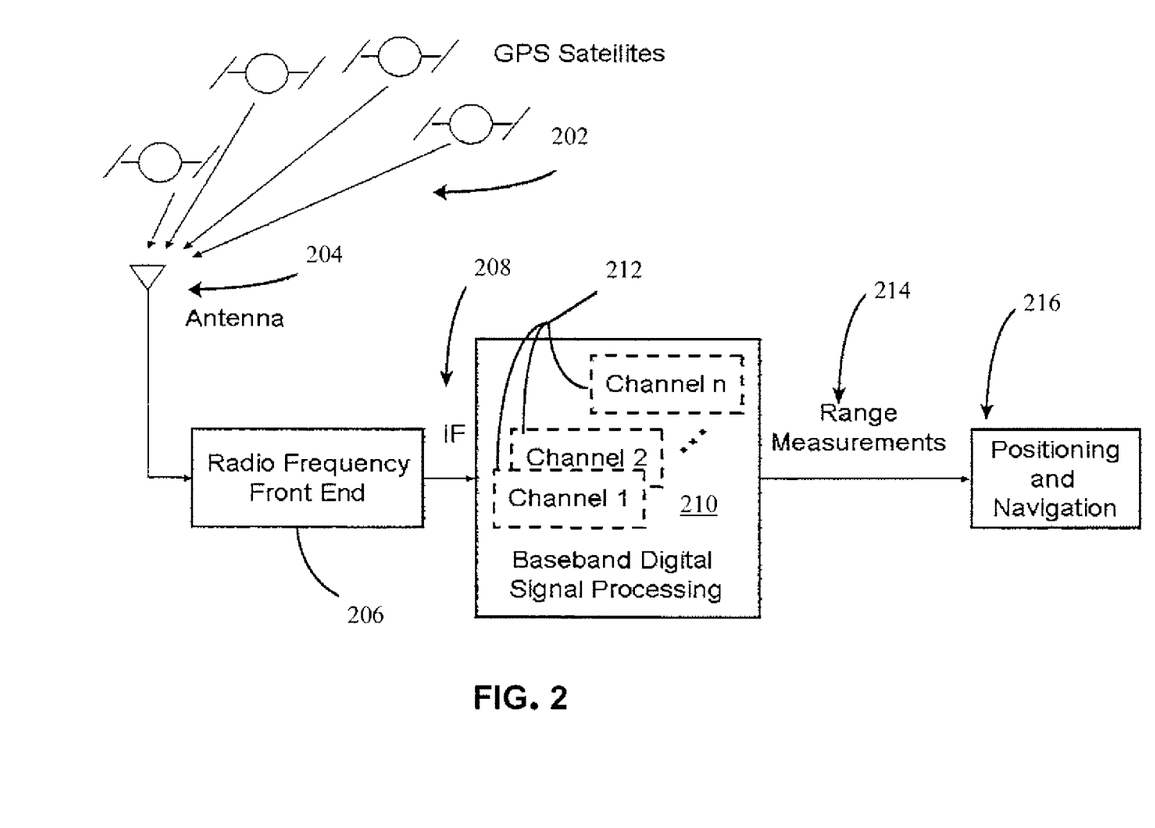
FIG. 2 is a block diagram of a GPS receiver, according to some embodiments of the invention.

FIG. 2 shows an example of the component parts of a receiver, such as receiver 142 in FIG. 1. The receiver in FIG. 2 comprises antenna 204, radio frequency front end 206, baseband digital signal processing (DSP) module 210, with n channels 212, and processor 216. GPS signals from GPS satellites 202 are received by the receiver antenna 204, and then processed by the radio frequency (RF) front end module 206 to generate an IF signal 208. The IF signal is processed by the baseband DSP module 210, which can be a form of ASIC hardware, to produce range measurements 214. Finally the range measurements are processed in a processor 216. The software in processor 216 controls signal acquisition and tracking operations carried out by DSP ASIC 210, and processor 216 also carries out bit sync, frame sync, and GPS measurement generation tasks. In some embodiments of GPS receivers, the processor also runs navigation algorithms for GPS position fixes; while in other embodiments of GPS receivers, GPS navigation algorithms may not exist inside the GPS chip, but inside a host processor, where the host may, for example, be a cell phone. Further details of GPS receivers are widely available—for example, see E. Kaplan, Understanding GPS: Principles and Applications, $2^{nd}$ Edition, Artech House, Inc., 2006.

Acquiring a GPS satellite signal is achieved by searching for it in a two-dimensional space—in Doppler frequency domain and C/A code phase domain. Doppler frequency and code phase are two major characteristics of a GPS signal. The Doppler frequency of a received satellite signal is caused by relative motion between the satellite and a receiver, and the code phase represents the distance between the satellite and the receiver, with a modulus of one millisecond multiplied by the speed of light. Signal acquisition can also be thought of as a three-dimensional search process, where the third dimension is pseudo-random number (PRN), since each satellite has its own unique PRN and the receiver does not necessarily know which satellites are "visible." Recall that, as described above, the GPS system is a CDMA system in which each satellite transmits a different PRN code.

In addition to satellite signal strength, signal search strategy and acquisition false alarm rate, the size of a signal search space is an important factor in determining how quickly a signal can be acquired or dismissed. On average, the smaller a signal's search space (or uncertainty) the faster a receiver finishes searching for and then acquiring the signal.

Once a satellite signal is acquired and tracked, a GPS receiver can achieve bit synchronization and sub-frame synchronization of the signal and finally obtain pseudorange measurements from the signal. If there are enough (usually at least four) pseudorange measurements and if the corresponding valid satellite ephemerides are available, the receiver can solve for 3-D position and time (or time bias of receiver clock relative to GPS Time), i.e., a total of four unknowns, using, for example, the Least Squares method.

However, in the conventional GPS PVT algorithm, there is an underlying assumption that an accurate, typically on millisecond level, GPS Time is needed for a receiver to compute satellite positions. An inaccurate, for example, several seconds, estimate of GPS Time can cause different satellite position errors for different satellites, so this "big" receiver clock error is not the same as the common receiver clock bias which is the fourth unknown in the aforementioned conventional PVT problem. Though GPS Time, which is tagged on any GPS signal, can be decoded from the satellite signal in real time, a GPS receiver needs first to successfully finish bit-synchronization, sub-frame synchronization (also called frame-synchronization), and data demodulation for that signal. Not only does it take time to go through all these steps, but data demodulation may be impossible if the signal is too weak. Given an aided time with an accuracy of several seconds from, for example, a wireless communication network in assisted-GPS (AGPS) mode, some embodiments of the present invention provide a method of solving for position and time based on the conventional PVT algorithm. This can greatly improve TTFF performance of GPS receivers, without using a Sync Free Nav method.

TTFF is one of the most important GPS receiver performance aspects. In order to improve TTFF performance, methods of the present invention utilize SBAS signals to speed signal acquisition and GPS Time extraction. The methods include: reducing satellite signal frequency search range; optimizing space vehicle search lists; and extracting TOW from SBAS signals while delivering a GPS position fix.

Reduction of Satellite Frequency Search Range

Figure 3:
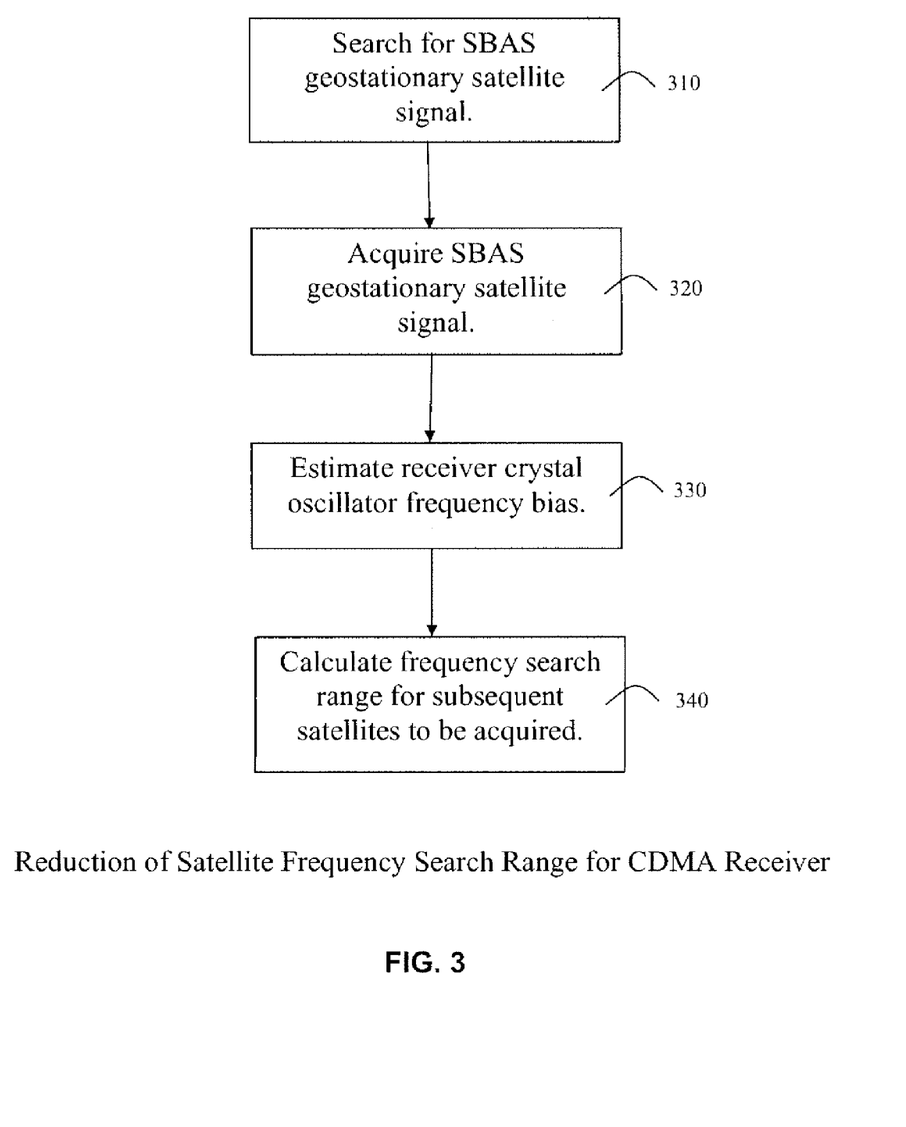
FIG. 3 is a flow chart for a method of reducing satellite frequency search range for a CDMA receiver, according to some embodiments of the invention.

FIG. 3 shows a flow chart for a method according to embodiments of the present invention for reducing satellite frequency search range for a GPS receiver or similar device. In brief, the method includes: searching for a SBAS geostationary satellite signal (310); acquiring the geostationary satellite signal (320); estimating the GPS receiver crystal oscillator frequency bias (330); and calculating a frequency search range for subsequent satellite signals to be acquired (340). The subsequent satellites may be SBAS satellites and/or GPS satellites. A more detailed explanation of this method is provided below.

Since SBAS satellites are geostationary, their positions are nearly fixed and known. This characteristic of SBAS satellites allows searching for the SBAS signal by a GPS receiver in a smaller range than would be required for a GPS satellite signal. Since there is almost no relative motion between an SBAS satellite and the earth's surface, Doppler frequency uncertainty caused by SBAS satellite orbit movement, $U_{f,dop,sv}$, is as small as about ±210 Hz, while GPS satellites' orbit motion (about two cycles per day) can cause a Doppler frequency uncertainty, $U_{f,dop,sv}$, as large as ±5000 Hz. The frequency search range $U_f$ of a received signal can be expressed as follows:

$$U_f = U_{f,dop,sv} + U_{f,dop,rx} + U_{f,bias,rx} \quad (1)$$

where, $U_{f,dop,rx}$ is the Doppler frequency uncertainty caused by receiver movement relative to the earth's surface, and $U_{f,bias,rx}$ represents the common receiver crystal oscillator frequency bias uncertainty. Although receiver movement can cause different magnitudes of Doppler frequency for different satellites, this portion of Doppler frequency search space is typically not very large for land-based navigation applications. Since $U_{f,dop,sv}$ is much larger for GPS signals than for SBAS signals, $U_f$ will also be larger for GPS signals.

C/A-code phase represents the distance between the receiver and the satellite, with a modulus of one millisecond times the speed of light. A GPS receiver typically searches for all 1023 C/A-code chips—the full code phase uncertainty. However, if aided with time and other information, the receiver may be able to reduce the C/A code search range. Whatever the circumstances, the C/A code phase search range for a geostationary SBAS satellite cannot be larger than that for a GPS satellite. Furthermore, a SBAS system typically has only two SBAS satellites, while the US GPS system has about 32 satellites. Consequently, the PRN search range for SBAS signals is smaller than that for GPS.

In summary, a GPS receiver typically has a smaller 3-D (i.e., Doppler frequency, code phase, and PRN) search range for a SBAS satellite signal than for a GPS one. Under the same signal acquisition condition and with the same acquisition algorithm, a SBAS signal can be found more quickly than a GPS signal due to its smaller search range. Furthermore, SBAS signals are typically stronger than GPS signals. With a 0 dBi RHCP antenna on the earth surface, WAAS signal strength is between −161 dBW (at 5° elevation) and −155 dBW, while GPS signal strength is between −160 dBW and −158 dBW. The characteristics of smaller signal search range and stronger signal strength mean that a GPS receiver can acquire SBAS signals more quickly than GPS signals. Some embodiments of the present invention utilize this advantage by requiring the GPS receiver to search for SBAS signals first, before searching for any GPS satellite signals.

According to an embodiment of the invention, a GPS receiver searches for SBAS signals first. Once a SBAS signal is acquired, the receiver crystal oscillator frequency bias $f_{bias,rx}$ is estimated. Similar to Equation (1), the received signal carrier frequency f, which is measured by the receiver, can be expressed as:

$$f = f_1 + f_{dop,sv} + f_{dop,rx} + f_{bias,rx} \quad (2)$$

where, $f_1$ is the nominal GPS/SBAS carrier center frequency −1575.42 MHz. Based on Equation (2), the receiver frequency bias $f_{bias,rx}$ can be estimated as:

$$f_{bias,rx} = f - f_1 - (f_{dop,sv} + f_{dop,rx}) \quad (3)$$

The Doppler frequency $f_{dop,sv}$ caused by SBAS satellite movement is small, as explained above, and may be regarded as zero. Unknown Doppler frequency $f_{dop,rx}$ caused by receiver movement may also be set at zero for the purpose of estimating $f_{bias,rx}$. Of course, if there is enough information available to the GPS receiver, the receiver can calculate Doppler frequencies $f_{dop,sv}$ and $f_{dop,rx}$ in order to more accurately estimate $f_{bias,rx}$.

Now that receiver oscillator frequency bias $f_{bias,rx}$ has been estimated, and therefore, the frequency uncertainty $U_{f,bias,rx}$ associated with receiver oscillator frequency bias is collapsed into zero, Equation (1) can be rewritten:

$$U_f = U_{f,dop,sv} + U_{f,dop,rx} \quad (4)$$

A small frequency uncertainty may be added in the above equation in order to compensate for the inaccurate estimate of $f_{bias,rx}$. Equation (4) may be used to define a frequency search range for all remaining signals which have not been acquired. Since Equation (4) delivers a smaller frequency search range $U_f$, acquiring the remaining satellite signals is now faster.

To underline the importance of determining the receiver frequency bias, an example of the size of a receiver frequency bias uncertainty is provided as follows. For a 2 ppm crystal oscillator, with a frequency of 1575.42 MHz, the corresponding frequency uncertainty is equal to $2 \times 10^{-6} \times 1575.42 \times 10^6$ Hz, i.e. ±3151 Hz, which is typically much larger than the Doppler frequency uncertainty for a land-based receiver. This means that when a SBAS satellite, such as a WAAS satellite, is acquired first, then the search range of other to-be-acquired signals may be collapsed since the WAAS uncertainty is very small compared with the crystal uncertainty, which is not true if a GPS satellite is acquired first.

Since acquisition performance can be improved by acquiring a SBAS signal first, a lower-quality crystal oscillator may be used in a GPS receiver while maintaining the same acquisition performance. In other words, some embodiments of the present invention may allow for the use of crystal oscillators in GPS systems which are less accurate without sacrificing receiver acquisition performance. Although a lower-quality crystal oscillator will have a larger frequency search range, it is cheaper.

Optimization of SV Search Lists

Every GPS product might have its own distinctive SV search list, with variations depending on whether the receiver is doing a "cold", "warm", or "hot" start. In the "hot start" mode the receiver has valid ephemeris and almanac, and the position and time are known. In the "warm start" mode the receiver has expired ephemeris but valid almanacs, and the initial position and time are given. In the "cold start" mode the receiver has no knowledge of position, time or ephemeris. As expected, the "hot start" mode results in short (good) TTFF while the "warm start" mode, which has no current ephemeris, requires live decoding of ephemeris and this results in longer (worse) TTFF. The "cold start" takes still more time for signal search and then the first position fix since the receiver does not know each satellite's visibility in the sky without time and position information. However, once a SBAS satellite signal is acquired the order in which GPS satellites are searched for, as determined by the SV search list, may be improved. More specifically, based on the LOS to the acquired SBAS satellite, the existing SV search list may be reordered and/or optimized.

If a SBAS signal is acquired, it means that the SBAS satellite is "visible," and this hints that the area around the LOS of the SBAS satellite may be clear and open for satellite acquisition. It may be assumed that GPS satellites located around this direction have a higher probability of being visible than those in other directions. This is the principle that is used to reorder the SV search lists. For example, referring to FIG. 1, if it is assumed that the LOS from the GPS handset 140 to the SBAS satellite 112 is clear, then the SBAS satellite 112 is "visible" from the handset 140. Using the aforementioned principle, it is then assumed that the satellites 116 and 118 located around the LOS to the "visible" SBAS satellite 112 have a higher probability of being "visible" than satellites 114 and 120.

Figure 4:
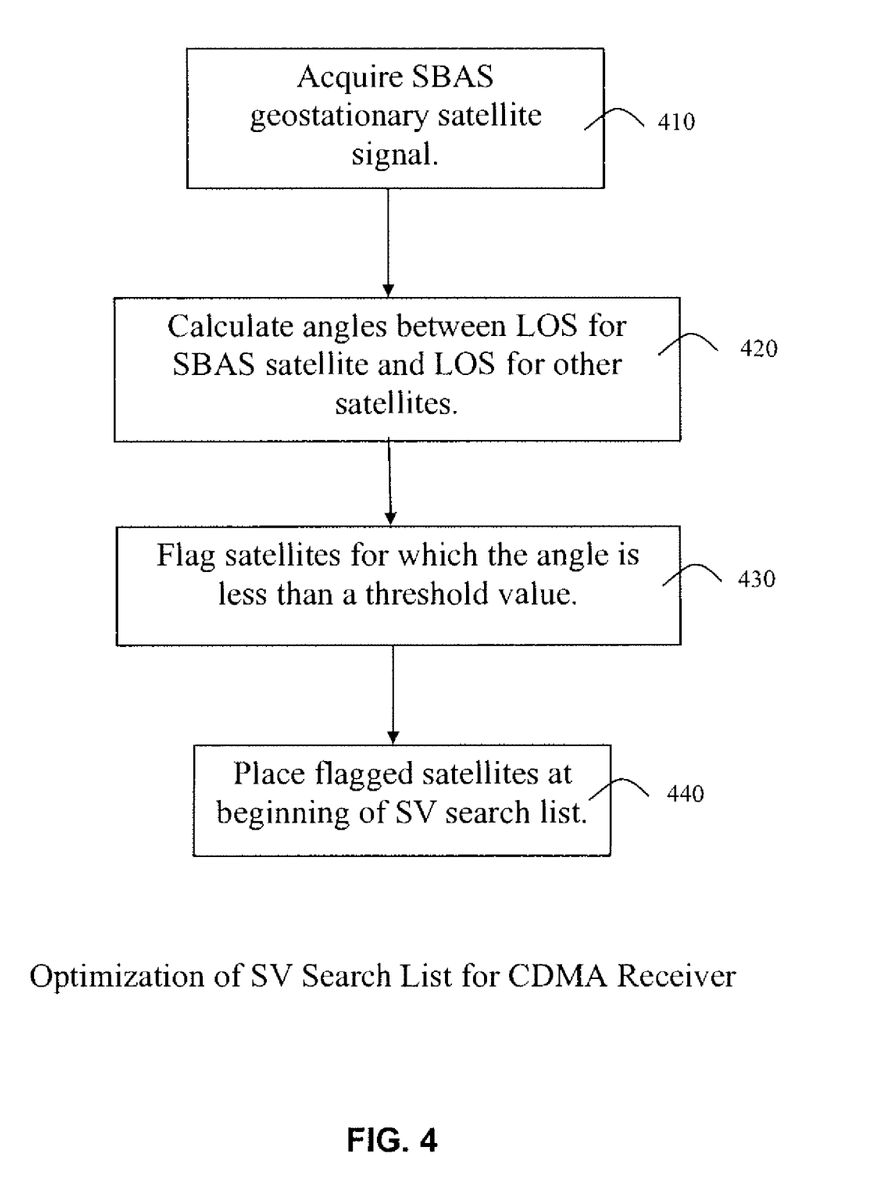
FIG. 4 is a flow chart for a method of optimizing a satellite search list for a CDMA receiver, according to some embodiments of the invention.

Based on this principle, a method for reordering a SV search list according to some embodiments of the present invention is provided as follows, as shown in FIG. 4. The signal for a geostationary satellite is acquired (410). The angles between the LOS of the geostationary satellite and the LOS of every satellite which may be acquired are calculated (420). These angles are compared with a predetermined threshold value, and then the satellites whose angles are less than the threshold are flagged (430). The flagged satellites are placed at the beginning of the SV search list (440). In some embodiments, the flagged satellites may be reordered in order of the size of the calculated angle, with the satellite with the smallest angle first; the reordered flagged satellites may then be placed at the beginning of the existing SV search list. The geostationary satellite may be a SBAS satellite, such as a WAAS satellite.

The method of optimizing an existing SV search list is described in more detail in the following steps: (1) calculate the LOS unit vector in the ECEF-84 coordinate system, say, (x,y,z), for the SBAS satellite which has been acquired and for all other satellites which have not yet been acquired; (2) calculate the angular separation between the SBAS satellite and all the other satellites based on their LOS unit vectors (x,y,z) calculated in (1); (3) if an angle is smaller than a threshold, then the corresponding satellite to be acquired is declared to be in the vicinity of the direction of the visible SBAS satellite, where the threshold may be set, for example, at $20°\times\pi/180°=0.3491$ radians; (4) the satellites in the vicinity of the direction of the visible SBAS satellite are given a higher priority in the SV search list. A simple way of reordering the original SV search list is to: (a) order the satellites in the vicinity of the SBAS satellite, as determined in (3), according to their angular separation calculated in (2), from small to large; and then (b) insert these reordered satellites at the beginning of the SV search list, while removing their original entries in the list. Note that the threshold, as described above, may be adjusted based on feedback from testing the method.

The above method is just one way of determining the angular separation of two satellites and reordering a satellite search list. There may be other methods for achieving the same goal. For example, the above method assumes that only one SBAS satellite has been acquired; however, if more than one SBAS and GPS satellite are acquired, the SV search list can still be updated based on the same basic concepts as described above.

Satellite LOS calculations need information about the current time, receiver position and almanacs (or ephemerides), so optimizing a SV search list based on an acquired SBAS satellite may only be possible for GPS receiver "warm" and "hot" starts.

Extraction of TOW (GPS Time) from SBAS Signals

The third important benefit of acquiring and tracking SBAS signals is the ability to extract GPS Time. The GPS time may be extracted directly from a sub-frame synchronized SBAS signal with some time aiding information. In other cases when aiding time is not very accurate, the GPS time may still be extracted from a sub-frame synchronized SBAS signal with other redundant satellite measurements. A GPS position fix may be obtained soon after GPS time is extracted or at the same time when GPS time is resolved. Note that "obtaining a GPS position fix" and "solving for the GPS receiver position" are used interchangeably herein.

Figure 5:
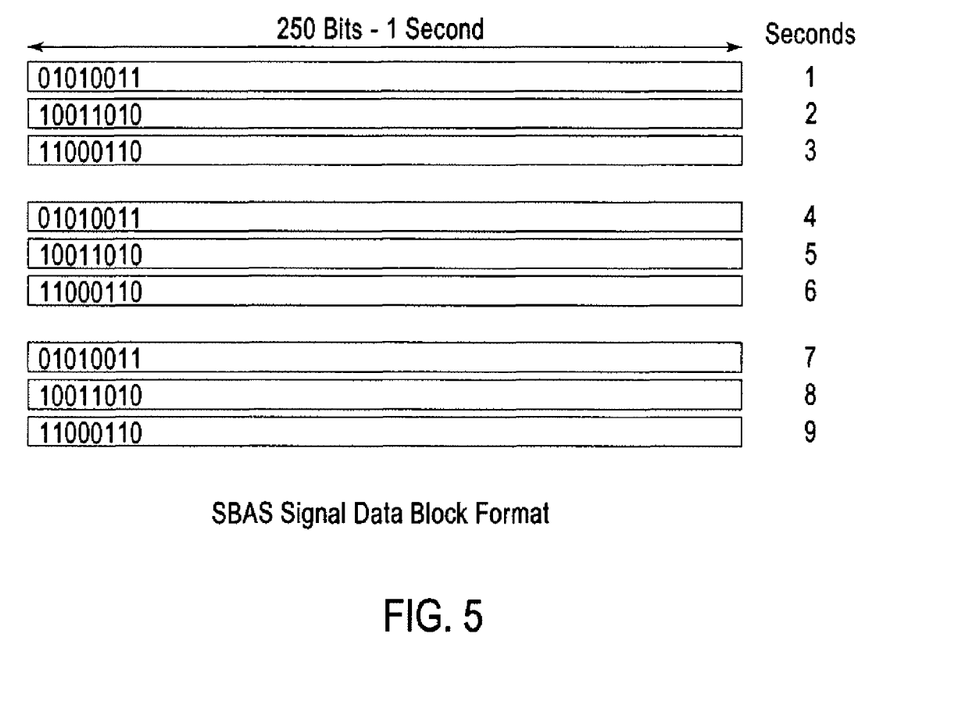
FIG. 5 shows an example SBAS signal data block format.

Before introducing the method for extraction of TOW from SBAS signals, SBAS signal message format is explained. SBAS satellites broadcast 500 symbols per second (sps). After Viterbi decoding by the GPS receiver, the SBAS signals consist of 250-bit messages (sub-frames) which are one second long, as shown in FIG. 5. Note, for comparison, that GPS sub-frames are 6 seconds long. Each SBAS message starts with an 8-bit preamble, followed by a 6-bit message type identifier and data contents, and finally ends with a 24-bit parity. The SBAS preamble is of particular interest herein. The preamble is a 24-bit unique word, distributed over three successive sub-frames. These three 8-bit words are made up of the sequence of 01010011 10011010 11000110. As seen in FIG. 5, this sequence repeats every three seconds. SBAS is designed so that the start of every other 24-bit preamble from a SBAS satellite will be synchronous with the start of a 6-second GPS satellite sub-frame epoch.

The process of sub-frame synchronization includes collecting enough bits, and then searching for three eight-bit preamble bit patterns and their reverses (switch all "1"s and "0"s). This provides a total of six possible preamble patterns to search for in the received signal bits. If, for example, two consecutive or three consecutive SBAS preambles have been found as expected, then sub-frame synchronization is finished. Thus, a conservative estimate of time to finish sub-frame synchronization in a strong SBAS signal environment is approximately $(2+3)/2=2.5$ seconds. In contrast, since a GPS sub-frame is 6 seconds long, the time to finish GPS signal sub-frame synchronization by successfully finding one or two consecutive preamble matches is approximately $(6+12)/2=9$ seconds. In general, sub-frame synchronization for SBAS signals is much faster than for GPS signals. Note that the search process keeps running against incoming bits until there is a match or a frame synchronization declaration and that bits collected before a match is found may be deleted. The probability of a false match may be calculated as follows. Assuming a frame synchronization method requires two consecutive preamble matches, and since data bits may be regarded as random, the probability that 16 random bits coincide with two preambles is equal to $(½)^{16}=1.526E-5$. This is the false alarm rate for that GPS frame synchronization method. In reality, the false alarm probability may be much smaller because of additional parity checks that may be made.

Figure 6:
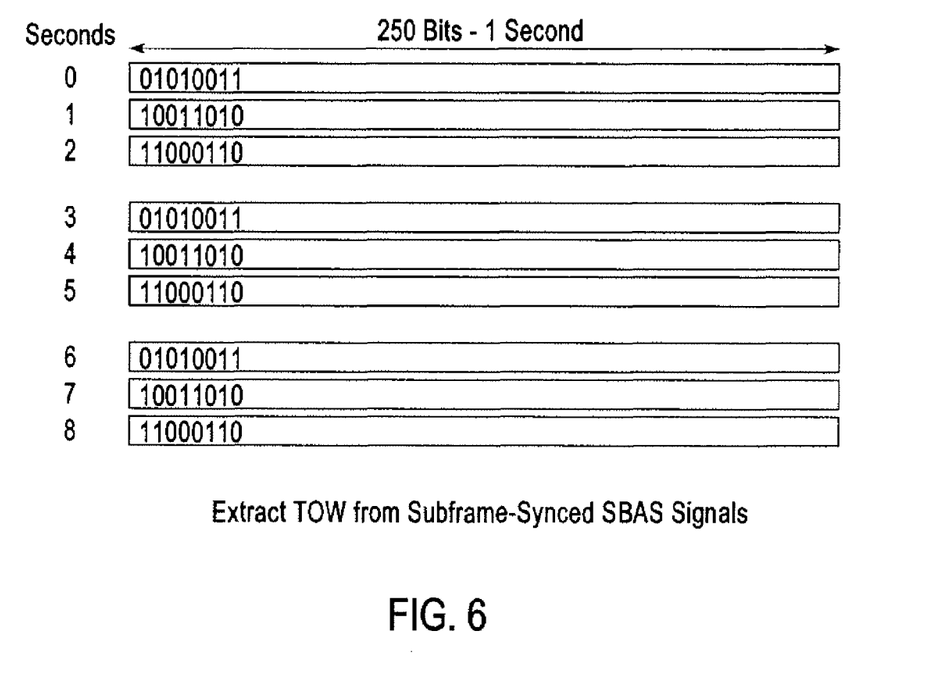
FIG. 6 illustrates extraction of TOW from sub-frame synced SBAS signals, according to some embodiments of the invention.

Unlike GPS messages, SBAS messages do not directly contain bits for TOW. However, the synchronization between SBAS signals and GPS signals, described above, may be used to derive the TOW from a sub-frame synchronized SBAS signal. For example, referring to FIG. 6, if SBAS signal sub-frame synchronization has been achieved, then the signal transmission time at the start edge of a sub-frame starting with preamble 10011010 may be 1 second, but it may also be 4, 7, 10, etc. In other words, an absolute TOW may be derived from a sub-frame synchronized SBAS signal with an ambiguity of three seconds.

If a GPS receiver does not have any aided time information, then the three-second ambiguity in TOW derived from a SBAS signal cannot be resolved without some further information. The receiver may wait for sub-frame synchronization of a GPS satellite signal and then decode the signal to calculate an unambiguous TOW. Alternatively, if there is some externally aided time information, the three-second ambiguity might be resolved, and the TOW can be calculated before being decoded from GPS signals. Once the TOW is obtained, new GPS and other SBAS signals may be used in PVT (position, velocity and time functionalities) algorithms for GPS position fixes, even if these new signals have not yet been bit-synchronized or subframe-synchronized.

The complexity of determining the TOW based on a sub-frame synchronized SBAS signal depends on the size of the aided time uncertainty. When aiding time information is received by a receiver, the information typically contains both time and its accuracy (i.e., uncertainty). Two different scenarios are presented which require different methods for utilizing aided time information in helping to determine the TOW.

Figure 7:
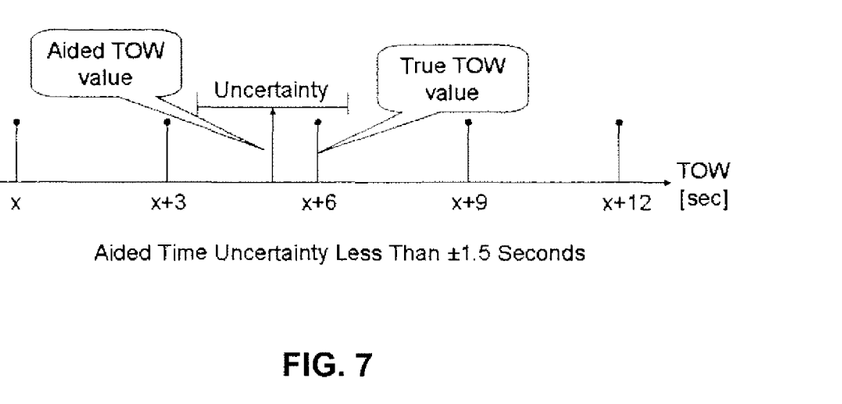
FIG. 7 illustrates determination of TOW with an aided time uncertainty of less than ±1.5 seconds, according to some embodiments of the invention.

In the first scenario, the uncertainty in the aided time is less than ±1.5 seconds. Note that most cellular networks provide time accurate to 2 seconds, so will be a suitable source for the time in this example. If the aided time at one signal instant is y seconds with an uncertainty of ±σ seconds, where σ is less than 1.5 seconds, then the true time will be in the range of y−σ to y+σ seconds. Meanwhile, if a SBAS signal enters sub-frame sync status, then the TOW for that signal instant is equal to, say, x+3n seconds, where n is an unknown integer representing the three-second ambiguity. Therefore, as shown in FIG. 7, the true, absolute TOW should be the one in the range [y−σ, y+σ]. Since the width of the range is less than 3 seconds, there will be only one integer n for which x+3n lies in the range. Another way of describing this method is the true TOW will be given by the integer n which gives the value x+3n which is closest to y. In the example shown in FIG. 7, the true value of the TOW is with n=2.

After the true TOW is determined, the navigation software can calculate a GPS position fix, given enough valid satellite measurements, if the ephemerides for the satellites are available. When the TOW is known, channels corresponding to these measurements used in the navigation software are not necessary to have finished sub-frame sync or even bit-sync processes. Measurement editing functions in the navigation software can determine 1 ms and/or 20 ms ambiguities in measurements, if any, without using "sync-free" navigation. (Note that one C/A code is 1 ms long, and one bit is 20 ms long. GPS receivers actually measure range, or distance, in a module of 1 ms, i.e., sub-millisecond. If bit synced, then the receiver solves millisecond ambiguity; if frame synced, the receiver solves 20 ms ambiguity. Beyond 20 ms, the receiver needs to decode TOW for a final, unambiguous range, or time.) Either four measurements are needed for a 3D position fix, or three measurements are required if the receiver altitude constraint is applied, where the receiver altitude value is given and known. Since there is a SBAS measurement which is used to extract GPS time, three more measurements, either from GPS satellites and/or from other SBAS satellites, are needed for a 3D fix where the receiver altitude is unknown.

Figure 8:
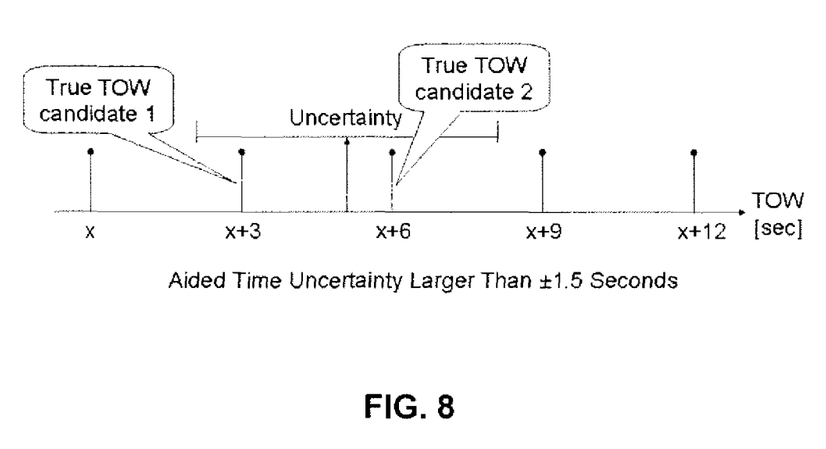
FIG. 8 illustrates determination of TOW with an aided time uncertainty of greater than ±1.5 seconds, according to some embodiments of the invention.

In a second scenario, the uncertainty of aided time is larger than ±1.5 seconds. As shown in FIG. 8, the true TOW, based on aided time information, is in the range of [y−σ, y+σ] seconds, where σ is larger than 1.5 seconds, while a sub-frame synced SBAS signal tells us that the TOW is equal to x+3n, where n is an integer. So depending on the size of σ, there may be one, two or more true TOW value candidates in this range. For wireless aiding, σ can be as large as several seconds, so fortunately there should not be too many TOW candidates. In the example shown in FIG. 8, two possibilities lie within the range—TOWs for n=1, 2.

If there is only one TOW candidate, it must be the true one. Then, GPS position fixes can be calculated using the same method as described in the first case, where the uncertainty of aided time is less than ±1.5 seconds, and four valid measurements are required. However, when there are two or more TOW candidates, at least five valid measurements are required to resolve the TOW and allow a GPS fix.

The method for determining the TOW, when multiple TOW candidates exist, in the second scenario may be as follows. First choose one TOW candidate and calculate a position fix using the same method as described in the first scenario, then choose another TOW candidate and calculate again, and repeat until all TOW candidates have been used. Now, since there is one and only one true TOW in all of these candidates, examination and comparison of these position fixes is carried out in order to find the true one. The basic idea of finding the true one is to take advantage of redundant measurements and some common knowledge. Redundant measurements can tell us the quality or falseness of a position fix. This is the reason why at least five measurements are required instead of four which is normally enough for a 3D fix. First, measurement residual vector length for each position fix corresponding to each TOW candidate is calculated. If x is a vector of pseudorange measurement residuals, its length l is defined as $$l=|x|=\sqrt{x^T x} \qquad (5)$$

Second, the plausibility of each calculated receiver position is checked. A position fix location is considered to be reasonable if it is close to the earth's surface and/or close to some estimated receiver position. Third, the method searches for the position fix corresponding to the smallest measurement residual vector length for which the position also seems reasonable. Thus, the corresponding TOW candidate associated with this position fix is deemed to be the true one. At this point, extracting TOW and delivering a position fix have been simultaneously achieved.

Figure 9:
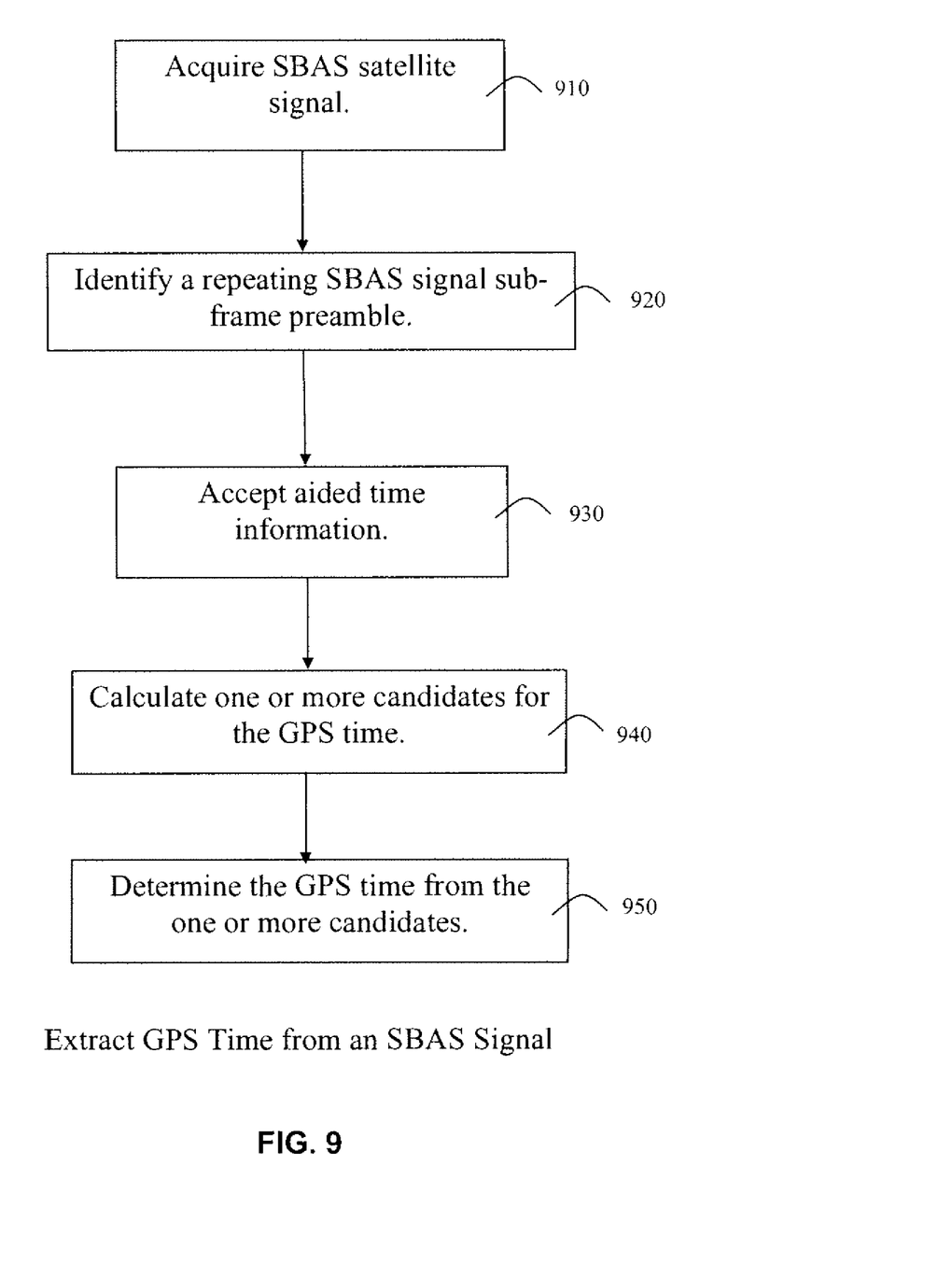
FIG. 9 is a flow chart for a method of determining GPS time from a SBAS signal, according to some embodiments of the invention.
Figure 10:
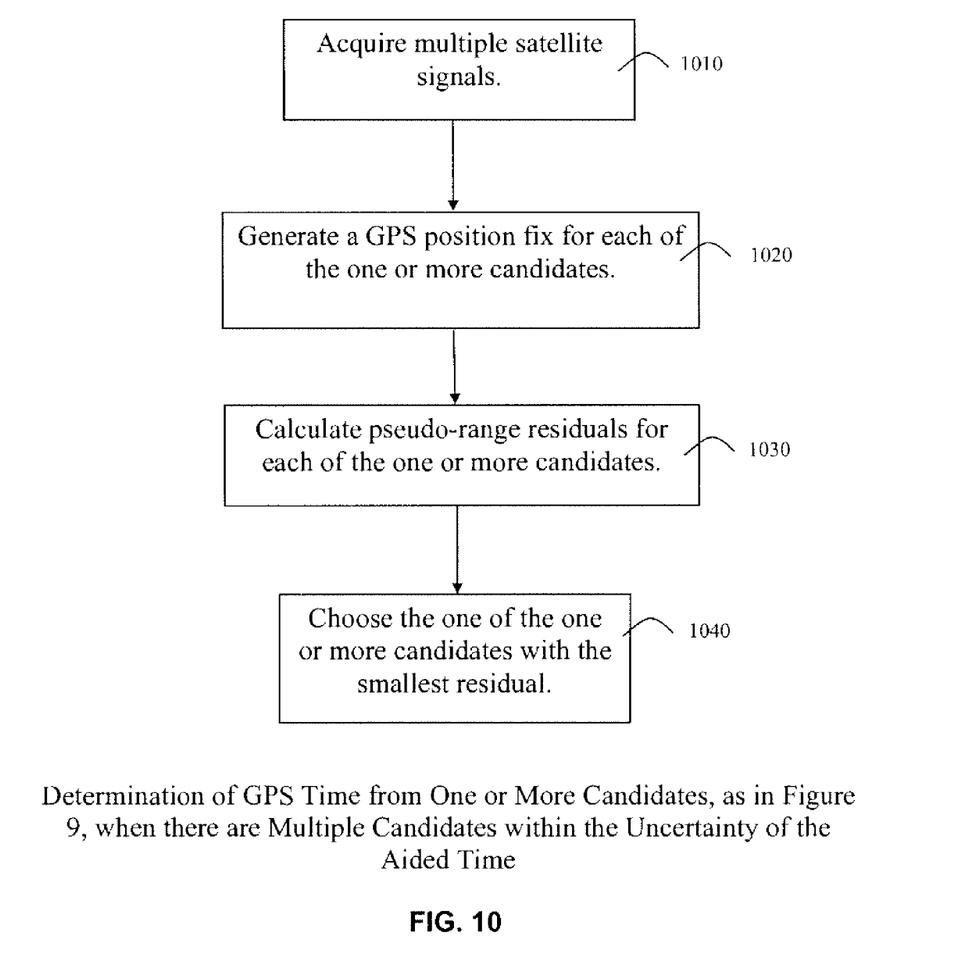
FIG. 10 is a flow chart for a detail of the method of FIG. 9.

The above methods for determining GPS time are shown in FIGS. 9 and 10. In FIG. 9 a method for a GPS receiver of extracting GPS time from a satellite-based augmentation system (SBAS) signal and aided time information comprises: acquiring the SBAS satellite signal (910); achieving sub-frame synchronization for this SBAS signal—identifying a repeating SBAS signal sub-frame preamble (920); accepting aided time information (930), which may happen anytime before determining the GPS time candidate(s); calculating one or more candidates for the GPS time (940); and determining the GPS time from the one or more candidates (950). The determining step (950) may include identifying the correct one candidate that is within the uncertainty of the aided time. When the aided time, derived from the aided time information, has a two-sided uncertainty of less than three seconds, there will only be one candidate within the uncertainty of the aided time. However, when the aided time has an uncertainty of greater than three seconds, there may be one or more candidates within the uncertainty of the aided time. When there is more than one candidate within the uncertainty of the aided time, then the determining step (950) may include: acquiring multiple satellite signals (1010); generating a GPS position fix for each of the one or more candidates (1020); calculating pseudo-range residuals for each of the one or more candidates (1030); and choosing the one of the one or more candidates with the smallest residual (1040). Furthermore, the plausibility of the position location may be checked, and the choosing step may comprise choosing the plausible one of the multiple candidates with the smallest residual.

Determination of GPS time from the SBAS signal, where the SBAS satellite is acquired by the GPS receiver first, as described above, may result in a faster determination of the GPS time and then a faster TTFF. Since a SBAS signal sub-frame is only one second long, which is shorter than six seconds for a GPS signal sub-frame, synchronization of the SBAS signal sub-frame may be achieved faster than for GPS signals.

Some methods according to the present invention for utilizing SBAS signals in signal acquisition and navigation have been described above. A description of an example of a method that integrates some of the aforementioned methods is provided below, along with identification of the hardware that may be involved.

The first part of SBAS satellite signal utilization occurs in a signal acquisition module. An SBAS satellite signal is searched for first before any GPS satellite signals. Once a SBAS signal is acquired, the SV search list can be optimized. For a given GPS receiver, its baseband signal acquisition software has the following steps for implementing these features: (1) search for SBAS signals—this generally means that SBAS satellites should be on the top of an initial SV search list; (2) if a SBAS signal is acquired before any GPS signal, the receiver crystal oscillator frequency bias may be estimated, and then the estimated receiver frequency bias may be used to reduce the Doppler frequency search spaces of all other to-be-acquired satellites; (3) if a SBAS signal is acquired before any GPS signals in receiver "warm" and "hot" start modes, the distance (in radians) from this SBAS LOS to all other to-be-acquired satellites' LOSs are calculated first, and for those satellites whose distances are less than a threshold, they can be reordered in the sequence of ascending distance and then inserted at the head of the initial SV search list. Note that if a GPS satellite is acquired before any SBAS satellites, then in theory optimizing a SV search list can also be similarly done.

The second part of SBAS signal utilization occurs in the navigation processor. Once a SBAS signal finishes sub-frame synchronization, then given aided time information and enough valid measurements, a GPS receiver may have a position fix without using a sync-free navigation algorithm. For a given GPS receiver, its navigation software may have the following logic blocks and steps for implementing some embodiments of the methods of the present invention.

```
If (A SBAS signal is sub-frame synced before any GPS signals &Valid ephemerides of related
        satellites are all available & Aided time exists)
then
        calculate possible TOWs based on aided time and SBAS sub-frame sync;
        if (no TOW candidate)
                Do nothing, there could be some errors either in SBAS sub-frame sync or aided
                time information;
        else if (one TOW candidate)
                if (there are four or more measurements)
                        run NAV algorithm (with sync-free NAV algorithm disabled)
        else    // several TOW candidates
                if (there are five or more measurements)
                        for (each TOW candidate)
                                run NAV algorithm (with sync-free NAV algorithm disabled);
                                calculate pseudorange residual vector lengths;
                        find a TOW candidate which has a smallest residual vector length
                        if (the smallest residual vector length is less than a threshold & the
                                associated position fix location seems reasonable)
                                this TOW and position fix are true ones
                        Else
                                Do nothing, something (aided time, SBAS sub-frame sync,
                                        or measurements) is wrong
end
```

The present invention has been described with reference to methods that for the most part include searching for and tracking only one SBAS satellite. However, the methods of the present invention may include searching for and tracking multiple SBAS satellites.

The present invention has been described with reference to GPS systems. However, the methods of the invention are applicable to processing of signals by any receiver of satellite CDMA signals.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of reducing a satellite frequency search range in a satellite code division multiple access (CDMA) signal receiver, comprising:

identifying a frequency uncertainty for non-geostationary satellite signals, the frequency uncertainty including a receiver crystal oscillator frequency bias;

searching for a signal from a geostationary satellite;

acquiring said geostationary satellite signal;

estimating the receiver crystal oscillator frequency bias using the acquired geostationary satellite signal, wherein estimating the receiver crystal oscillator frequency bias includes estimating Doppler frequency uncertainty due to movement of the CDMA signal receiver relative to the geostationary satellite;

reducing the frequency uncertainty using the estimated receiver crystal oscillator frequency bias; and calculating a frequency search range for subsequent non-geostationary satellite signals to be acquired based on the reduced frequency uncertainty, wherein calculating the frequency search range includes adding together only (1) a Doppler frequency uncertainty caused by movement of said CDMA signal receiver relative to the Earth's surface and (2) a Doppler frequency uncertainty caused by movement of the orbit of the non-geostationary satellite relative to the Earth's surface.

2. A method as in claim 1, wherein said geostationary satellite signal is transmitted from a satellite-based augmentation system (SBAS) satellite.

3. A method as in claim 2, wherein said SBAS satellite is a wide area augmentation system (WAAS) satellite.

4. A method as in claim 1, wherein said CDMA signal receiver searches for said geostationary satellite signal before any other satellite signal.

* * * * *

UNITED STATES PATENT AND TRADEMARK OFFICE
CERTIFICATE OF CORRECTION

PATENT NO.       : 8,593,342 B2
APPLICATION NO.  : 12/402426
DATED            : November 26, 2013
INVENTOR(S)      : Chansarkar et al.

It is certified that error appears in the above-identified patent and that said Letters Patent is hereby corrected as shown below:

In the Specification

In Column 10, Line 42, delete "G-bit" and insert -- 6-bit --, therefor.

In the Claims

In Column 16, Line 7, in Claim 1, delete "surface and" and insert -- surface, and --, therefor.

Signed and Sealed this
First Day of April, 2014

Michelle K. Lee
*Deputy Director of the United States Patent and Trademark Office*